(No Model.) 2 Sheets—Sheet 1.

L. H. & O. N. KIMBALL.
HORSE HAY RAKE.

No. 541,169. Patented June 18, 1895.

Witnesses,

Inventors,
LEWIS H. KIMBALL
OWEN N. KIMBALL
by their attorneys

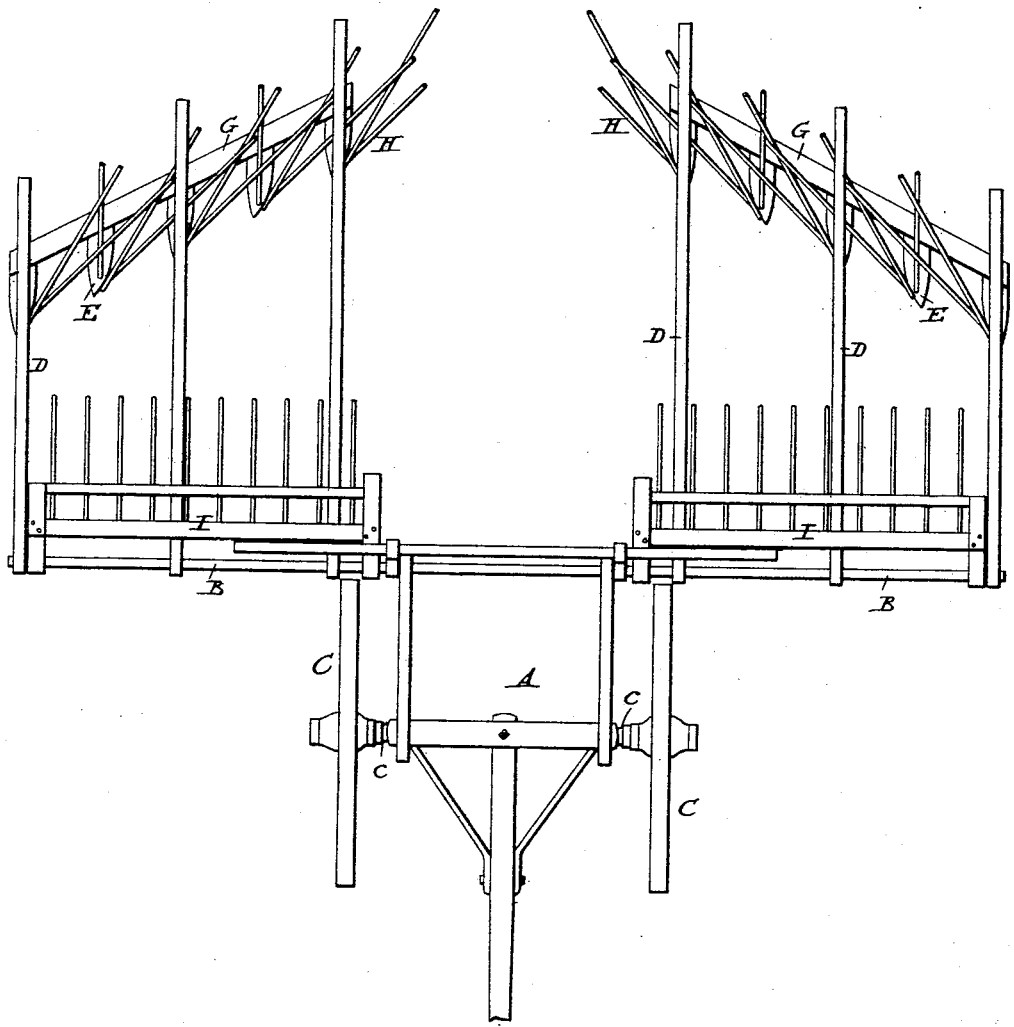

UNITED STATES PATENT OFFICE.

LEWIS H. KIMBALL AND OWEN N. KIMBALL, OF IOWA, JACKSON COUNTY, IOWA.

HORSE HAY-RAKE.

SPECIFICATION forming part of Letters Patent No. 541,169, dated June 18, 1895.

Application filed October 25, 1894. Serial No. 526,957. (No model.)

*To all whom it may concern:*

Be it known that we, LEWIS H. KIMBALL and OWEN N. KIMBALL, citizens of the United States, residing in Iowa township, in the county of Jackson and State of Iowa, have invented certain new and useful Improvements in Horse Hay-Rakes, of which the following is a specification.

Our invention relates to that class of horse hay rakes in which the hay gathered is formed into a wind-row parallel with the line of draft.

Our patent, No. 519,262, of May 1, 1894, shows an automatic center delivery hay rake in which a series of rake teeth arranged in two gangs is followed by windrow formers arranged diagonally in such manner as to form a windrow in the central line of draft. The windrow formers are shown as each consisting of a flat or slightly curved rigid board which scrapes the hay from the ground and guides it toward the central line of draft.

According to our present improvements, we construct each windrow former of a series of shoes or runners, hinged to their supports, and provided with a series of rearwardly extending yielding rods or fingers, by which arrangement, when obstructions are met, they are readily passed without undue strain or breakage. The windrow formers are so constructed that they may do some kinds of work without the use of rake teeth preceding them.

Figure 1:
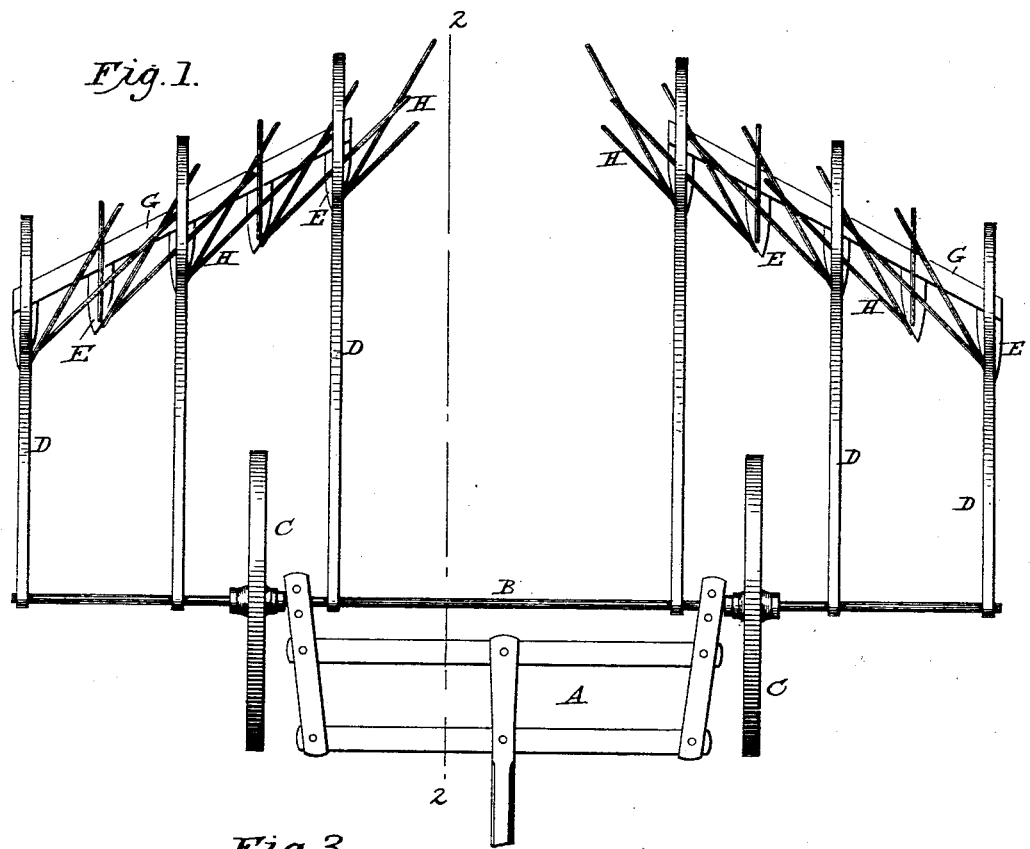
Figure 3:
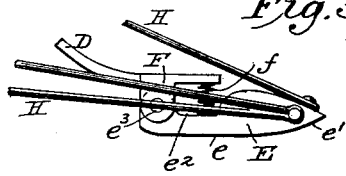
Figure 2:
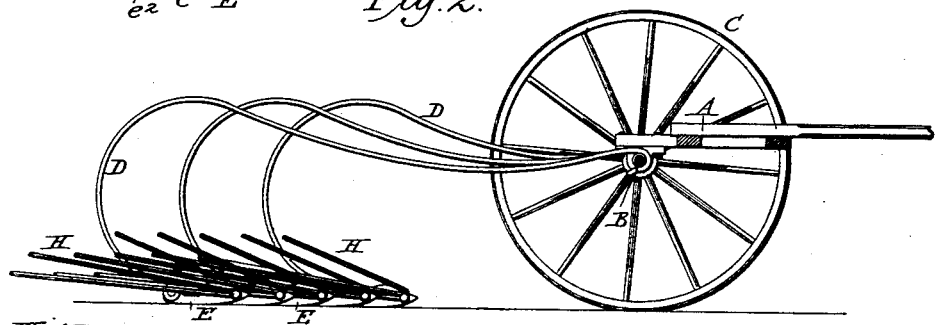

In the accompanying drawings, illustrating our invention, Figure 1 is a plan view of a horse hay-rake embodying our improvements, in which windrow-formers are shown attached to a sulky without the use of the rake-teeth shown in our patent above mentioned. Fig. 2 is a section on the line 2 2 of Fig. 1. Fig. 3 is a detail view of one of the shoes or runners. Fig. 4 is a plan view of our improved machine where the windrow-formers are used in connection with rake-teeth.

The frame or sulky A, may be of any approved construction. It is provided with bearings at its rear end for a horizontal shaft B on which the carrying wheels C are mounted. A series of draft bars D are hinged at their front ends to the shaft B, on each side of the central line of draft.

In the drawings, Fig. 1, we have shown three draft bars on each side. They are of different lengths, as shown, the longer bars on each side being nearest the central draft line. Each draft bar, as shown, is curved downwardly at its rear end and then forwardly to support a shoe or runner E, which, as shown in Fig. 3, is provided with a straight under surface $e$, an upwardly inclined front end $e'$ and a recess $e^2$. The runner is hinged at its rear end $e^3$ to a bracket F, secured to the lower end of the corresponding draft bar D. Between the front end of the bracket F, and the top of the shoe or runner, is interposed a spring $f$, which tends to hold the shoe in a horizontal or level position, and which permits the shoe to rise at its front end about the pivot $e^3$ as a center, when an obstruction is encountered.

As before stated, there is a shoe E, attached to each draft bar. These shoes are connected by a diagonally arranged beam G, secured to the brackets F and it has secured to it between the draft bars two additional shoes, as indicated in Fig. 1, there thus being five shoes or runners on each side of the central line of draft, but a greater or less number of draft bars may be employed, and a correspondingly greater or less number of shoes or runners may be used, but the arrangement and number illustrated is deemed best for practical purposes. Each shoe or runner has secured to it a series of rearwardly inclined and diverging yielding rods or fingers H, which are so arranged as to form on each side of the machine a frame-work which receives the hay gathered by the runners and guides it toward the central line of draft.

The machine thus constructed may be used to gather and form into a windrow hay, or the like, in any condition. It is, however, especially designed for gathering "wild hay." When working in a heavy crop, the windrow formers may be preceded by rake teeth, such as shown in our patent above mentioned, and as illustrated in Fig. 4.

When rake teeth are used, we prefer to slightly modify the construction of the machine. The sulky frame A, may be of ordinary construction. The wheels C are mounted on a special axle $c$, the shaft B being arranged in bearings at the rear end of the sulky frame. The draft bars D, are hinged to the shaft B, and the rake heads I are connected in any suitable manner to the shaft B, and may be operated either in the manner shown and described in our patent above mentioned, or in any other suitable way. The machine shown in Fig. 4 may be used to advantage in heavy crops. The hay will be gathered by the rakes and discharged either automatically or positively at proper intervals and will be received by the windrow formers and formed in a windrow in the central line of draft. The runners are arranged in the manner above described, so that should obstructions be met, such as stones partially buried in the earth, stumps, or the like, they will yield individually to pass the obstructions, and undue strain and breakage are thus avoided.

We claim as our invention—

1. The combination with a draft frame or sulky, of a wind-row former comprising runner supports, and a series of independently hinged shoes or runners bearing a frame to collect and guide the gathered hay.

2. The combination with a draft frame or sulky, of a diagonally arranged wind-row former comprising runner supports and a series of independently hinged shoes or runners bearing a frame to collect and guide the gathered hay, and springs interposed between the runners and their supports.

3. The combination of a frame or sulky, draft bars connected therewith, a series of shoes or runners hinged to the draft bars and rearwardly inclined rods secured to the runners and constituting a frame for collecting and guiding the hay.

4. The combination of a draft frame or sulky, draft bars hinged thereto, a series of runners hinged to the draft bars, a beam connecting the runners together, and additional runners hinged to the beam and interposed between the draft bars.

5. The combination with a draft frame or sulky, of two sets of draft bars arranged on opposite sides of the central line of draft, each set carrying a wind-row former diagonally arranged and consisting of a series of shoes or runners hinged to the draft bars and a series of yielding, rearwardly inclined rods secured to the shoes.

6. The combination with a draft frame or sulky, of two sets of rake teeth arranged on opposite sides of the central line of draft and two wind-row formers also arranged on opposite sides of the central line of draft and each comprising a series of individually hinged shoes or runners carrying a series of yielding, rearwardly inclined rods.

7. The combination of a draft frame or sulky, a series of draft bars, a series of runners hinged thereto, each having an upwardly inclined front end, and springs interposed between the runners and their supports.

In testimony whereof we have hereunto subscribed our names.

LEWIS H. KIMBALL.
OWEN N. KIMBALL.

Witnesses:
L. F. SUTTON,
W. J. KEEFE.